(No Model.)
W. W. SNOW.
CAR WHEEL.
No. 359,332. Patented Mar. 15, 1887.
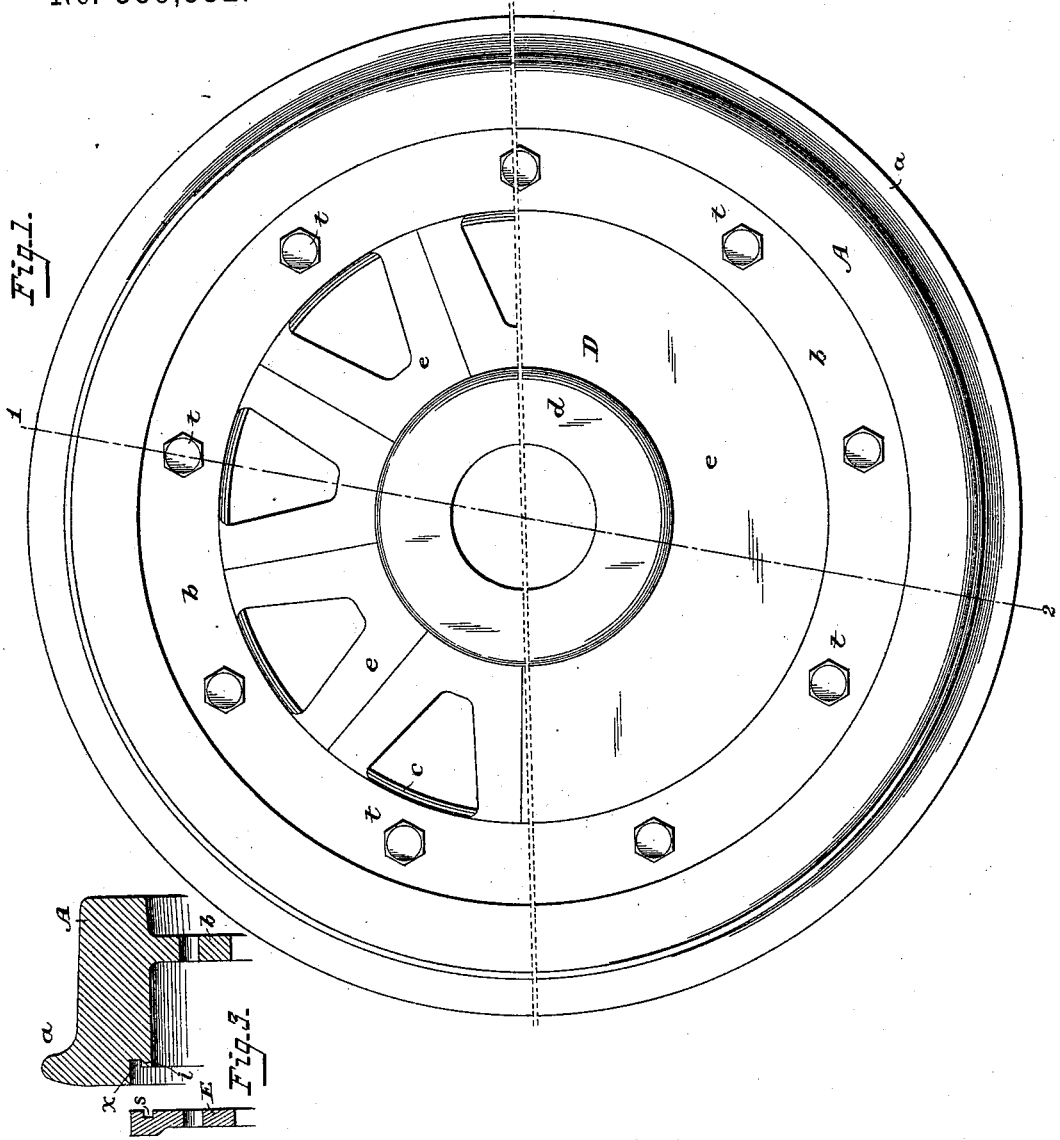
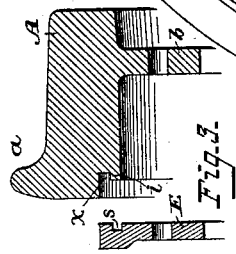
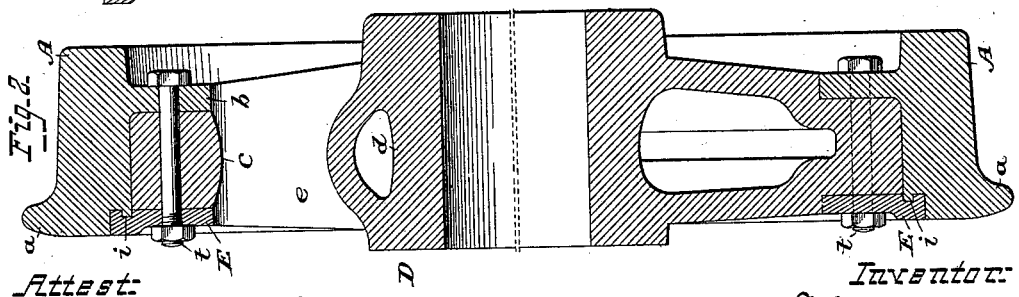
Attest:
Court A Cooper
Wm A Harries
Inventor:
Wm W. Snow,
By Foster and Freeman,
attys.

UNITED STATES PATENT OFFICE.

WILLIAM W. SNOW, OF RAMAPO, NEW YORK.

CAR-WHEEL.

SPECIFICATION forming part of Letters Patent No. 359,332, dated March 15, 1887.

Application filed December 30, 1885. Serial No. 187,166. (No model.)

*To all whom it may concern:*

Be it known that I, WILLIAM W. SNOW, a citizen of the United States, and a resident of Ramapo, in the county of Rockland and State of New York, have invented certain new and useful Improvements in Car-Wheels, of which the following is a specification.

My invention relates to that class of car-wheels in which a rim is bolted to the periphery of a body portion; and my invention consists in providing the rim with an internal flange against which the periphery of the body bears, and in securing a locking-ring to the rim and body by the means of bolts, as fully set forth hereinafter, and as illustrated in the accompanying drawings, in which—

Figure 1 is a side view illustrating the construction of my improved wheel, with the upper portion showing a body having spokes, and the lower portion a web or plate body. Fig. 2 is a section on the line 1 2, Fig. 1. Fig. 3 is a transverse section of the rim and ring detached.

A represents the rim of the wheel, which may be forged with a flange, $a$, as shown in the drawings, and constitute both the rim and the tire; or it may have a plain outer periphery, to which a separate tire is applied in any suitable manner. At the inner side of the rim, and a short distance from the outer side of the wheel, is an annular flange, $b$, the inner face of which bears against one side of the rim $c$, while its inner edge bears upon a shoulder, $m$, formed upon the spokes or web of the body D of the wheel, the said body being cast with the hub $d$, spokes or web $e$, and rim $c$ in one piece, a spoke-body being shown in the drawings. The rim $c$ of the body is somewhat narrower than the distance between the inner face of the flange $b$ and the inner face of the wheel, and in the space between the inner face of the wheel and the inner face of the rim $c$, I place a ring, E, the outer edge of which projects beyond the periphery of the rim $c$ and into a recess, $x$, formed in the inner face of the rim A, and an annular rib, $i$, at the inner part of the said recess, fits an annular groove, $s$, in the corresponding face of the ring E. The inner edge of the ring E bears upon a shoulder, $n$, on the spokes or web opposite the shoulder $m$. (See Fig. 2.) Through corresponding recesses in the flange $b$, the rim $c$, and the ring E extend bolts $t$, which are provided with nuts, or are riveted at their inner ends, and serve to clamp the ring E against the rim $c$ and against its bearing on the rim A, and to force the rim $c$ into close contact with the inner face of the flange $b$.

By constructing the wheel in the manner above described, I am enabled to forge the rim A with as great facility and with but little more expense than is required in forging an ordinary tire, while the body may be cast with spokes or with a continuous web in one piece, adapted for ready application to the rim with but little fitting, and the retaining-ring E may be readily formed and fitted to the parts to which it is applied; and it will be seen that the bolts clamp all the parts most securely together, that the outward thrust of the body is against the immovable flange $b$, and that the retaining-ring E bears no part of the strain resulting from such thrust. It will also be observed that the shoulders $m$ and $n$ of the body D serve to strengthen both the body and its tire, as well as to entirely obviate all danger from the shearing action of the parts upon the bolts due to thrusts from periphery to center of the completed wheel when under pressure.

The interlocking of the annular rib $i$ with the corresponding portion of the retaining-ring E serves effectually to prevent accident in case of the transverse fracture of the rim A, in which event the ring E will serve effectually to hold together the separated ends of the rim and prevent them from spreading outward away from the rim $c$.

I am aware that a wheel-body has been heretofore provided with a tire formed separate therefrom and held in position thereon through the medium of an inwardly-projecting flange integral with said tire and bearing against one side of said body, an annulus bearing against the opposite sides of said body and tire, and securing-bolts which pass through said flange, body, and annulus, and I therefore do not broadly claim such construction.

Without limiting myself to the precise construction and arrangement of parts shown, I claim—

1. The combination, with a wheel-body provided with a rim having shoulders projecting from its opposite sides, of a tire in contact with the periphery of the rim, a flange integral with the tire in contact with one side and one shoulder of said rim, a retaining-ring in contact with the opposite side and shoulder of said rim and with one side of the tire, and securing-bolts passing through said flange, rim, and retaining-ring, substantially as described.

2. The combination, with the rim A, having an inwardly-projecting flange, $b$, and with the body D, having a rim, $c$, and shoulders $m$ and $n$, fitting against the inside surface and edge of the flange, and a retaining-ring, E, having a groove receiving an annular rib upon the rim A, substantially as set forth.

3. The combination, in a car-wheel, of a rim provided with an internal flange, a body having shoulders $m$ and $n$, fitting against the rim and flange at its periphery and shoulders, a locking-ring having a recess, $s$, adapted to an annular rib on the rim A, and bolts securing the rim, body, and ring together, substantially as described.

In testimony whereof I have signed my name to this specification in the presence of two subscribing witnesses.

WILLIAM W. SNOW.

Witnesses:
GARRETT BURGERT,
SIMON H. BROWN.